United States Patent
Thorne

(10) Patent No.: US 9,241,474 B2
(45) Date of Patent: Jan. 26, 2016

(54) ANIMAL HARNESS

(71) Applicant: Robert L. Thorne, Belleville, MI (US)

(72) Inventor: Robert L. Thorne, Belleville, MI (US)

(*) Notice: Subject to any disclaimer, the term of this patent is extended or adjusted under 35 U.S.C. 154(b) by 0 days.

(21) Appl. No.: 14/270,927

(22) Filed: May 6, 2014

(65) Prior Publication Data

US 2015/0320011 A1    Nov. 12, 2015

Related U.S. Application Data

(60) Provisional application No. 61/820,435, filed on May 7, 2013.

(51) Int. Cl.
*A01K 27/00* (2006.01)
*A01K 1/02* (2006.01)

(52) U.S. Cl.
CPC .............. *A01K 1/0272* (2013.01); *A01K 27/002* (2013.01); *A01K 27/003* (2013.01)

(58) Field of Classification Search
CPC ... A01K 15/021; A01K 15/02; A01K 15/022; A01K 27/00; A01K 27/002
USPC ................ 119/792, 712, 719, 908; 340/573.3
See application file for complete search history.

(56) References Cited

U.S. PATENT DOCUMENTS

| 5,749,324 | A * | 5/1998 | Moore | 119/719 |
|---|---|---|---|---|
| 5,893,339 | A * | 4/1999 | Liu | 119/792 |
| 6,003,473 | A * | 12/1999 | Printz | 119/859 |
| 6,253,713 | B1 * | 7/2001 | Giedeman et al. | 119/771 |
| 6,443,101 | B1 * | 9/2002 | Fazio | 119/792 |
| 6,450,130 | B1 * | 9/2002 | Goldberg | 119/792 |
| 6,487,992 | B1 * | 12/2002 | Hollis | 119/712 |
| 6,874,447 | B1 * | 4/2005 | Kobett | 119/712 |
| 7,131,400 | B2 * | 11/2006 | Wanveer et al. | 119/792 |
| 7,786,875 | B2 * | 8/2010 | Wu | 340/573.3 |
| D632,850 | S * | 2/2011 | Light et al. | D30/152 |
| D638,176 | S * | 5/2011 | Mugford | D30/152 |
| D677,841 | S * | 3/2013 | Gibbs | D30/152 |
| 8,505,494 | B2 * | 8/2013 | Mainini | 119/712 |
| 2005/0120976 | A1 * | 6/2005 | Kim et al. | 119/719 |
| 2008/0168953 | A1 * | 7/2008 | Kurt et al. | 119/859 |
| 2008/0236513 | A1 * | 10/2008 | Barlebo-Larsen et al. | 119/719 |
| 2009/0071414 | A1 * | 3/2009 | Caputo | 119/719 |
| 2010/0050955 | A1 * | 3/2010 | Pacheco et al. | 119/719 |
| 2011/0017150 | A1 * | 1/2011 | Caputo et al. | 119/719 |
| 2011/0030622 | A1 * | 2/2011 | So | 119/719 |
| 2011/0083615 | A1 * | 4/2011 | Aaron et al. | 119/771 |
| 2011/0174235 | A1 * | 7/2011 | Vinano et al. | 119/712 |
| 2012/0048213 | A1 * | 3/2012 | Konovalov | 119/718 |
| 2013/0104812 | A1 * | 5/2013 | Levi et al. | 119/712 |
| 2013/0327280 | A1 * | 12/2013 | Thalmann | 119/719 |

* cited by examiner

*Primary Examiner* — Yvonne Abbott-Lewis

(74) *Attorney, Agent, or Firm* — The Weintraub Group, P.L.C.

(57) ABSTRACT

An animal harness for an animal includes a loop of webbing, which encircles the back, neck and shoulder of the animal. A pouch is affixed to the loop. A pulsating device is disposed within the pouch and transmits same to the animal through the chest and about its heart to calm the animal during transport.

18 Claims, 3 Drawing Sheets

ANIMAL HARNESS

CROSS-REFERENCE TO RELATED APPLICATIONS

This application is a completion application of co-pending U.S. Provisional Application Ser. No. 61/820,435, filed May 7, 2013, for "Animal Harness", the disclosure of which is hereby incorporated by reference in its entirety including the drawings.

BACKGROUND OF THE INVENTION

1. Field of the Invention

The present invention concerns animal harnesses. More particularly, the present invention concerns animal harnesses which includes, a seat belt incorporated thereinto. Even more particularly, the present invention concerns harnesses of the type herein described which further includes means for calming the animal during travel and while resting within a vehicle.

2. Description of the Prior Art

The prior art is replete with various harnesses for transport of animals and, in particular canines or dogs. More particularly, harnesses have been devised for restraining dogs while in a moving vehicle and/or left behind unattended in a vehicle for any particular time. Many of these prior art harnesses also convert into leashes or include webbing or belting associated therewith which define leashes such that there is multiple use for such harnesses.

However, as is known to those skilled in the art to which the present invention pertains canines and other animals usually become hyperactive during travel or being left unattended in a vehicle. To date no device has been provided which can "calm" an animal when traveling or being left unattended in a vehicle.

There is known in the prior art certain stuffed animal toys, particularly adapted for cats and dogs, which include a pulsating device, which simulates a heartbeat. When the animal engages the stuffed toy i.e. lies down next to or on the toy and senses the pulsation, the pulsing calms the animal.

However, heretofore, to the best of the applicant's knowledge, there has not been devised a harness which incorporates a soothing pulsing device for calming an animal, be it a dog, or other animals, or a full-grown dog, while restrained within a vehicle. It is to this to which the present invention is directed.

SUMMARY OF THE INVENTION

In accordance herewith the present invention, generally, comprises: an animal harness comprising; (a) a looped webbing which encircles the back, neck and shoulders of an animal. (b) a pouch secured to the webbing, the pouch being in contact with the animal and (c) a pulsating device disposed within the pouch for calming the animal.

The harness hereof further includes a "quick release" or "buckle" for removably attaching a seatbelt latch connected thereto for facilitating transport of the animal.

The pulsating device is used to calm the animal.

The present harness has particular efficacy with dogs and cats.

For a more complete understanding of the present invention reference is made to the following detailed description and accompany drawing where like reference characters refer to like parts throughout the several views in which:

DESCRIPTION OF THE PREFERRED EMBODIMENTS

Figure 1:
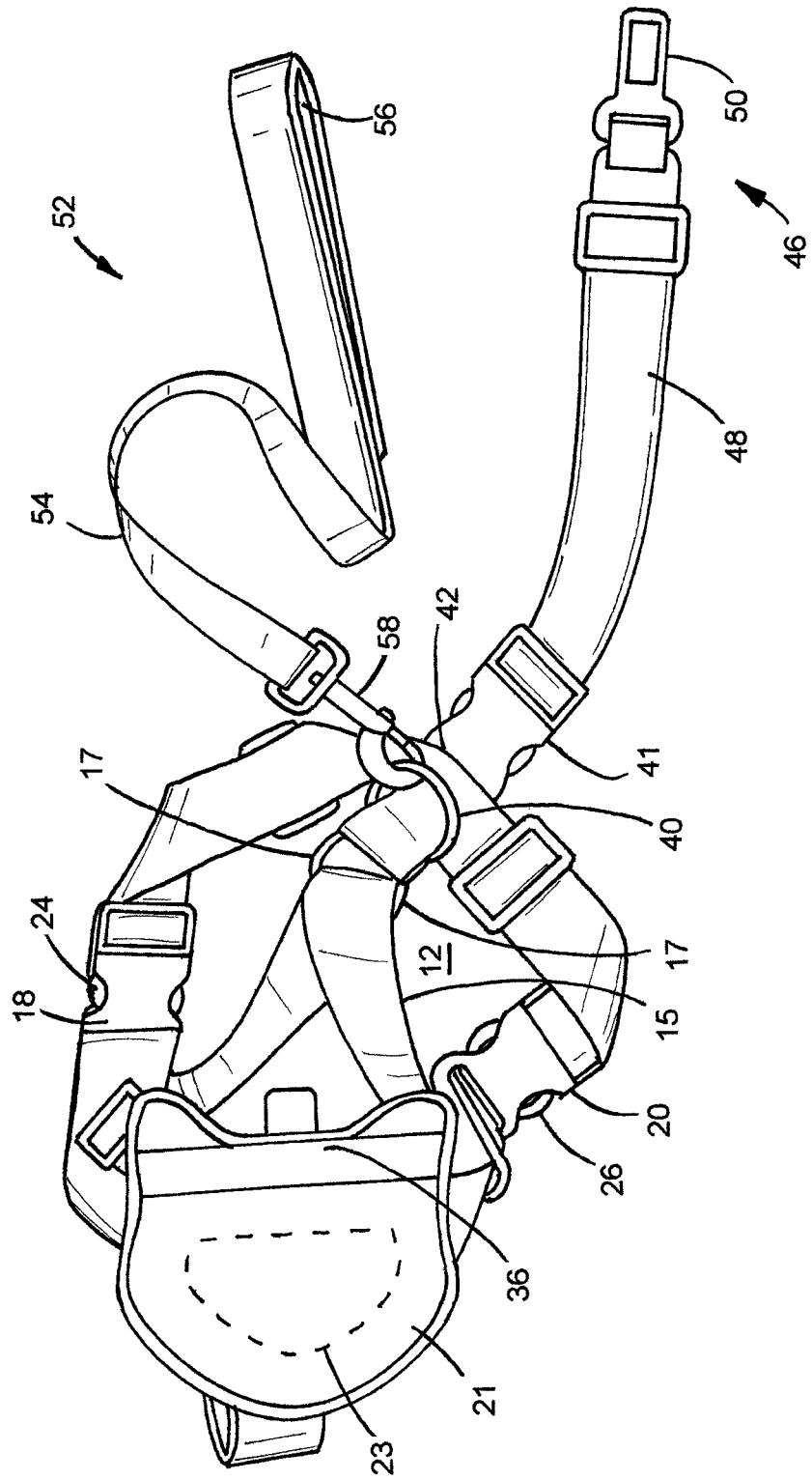
FIG. 1 is a plan view of a harness in accordance with the present invention.
Figure 2:
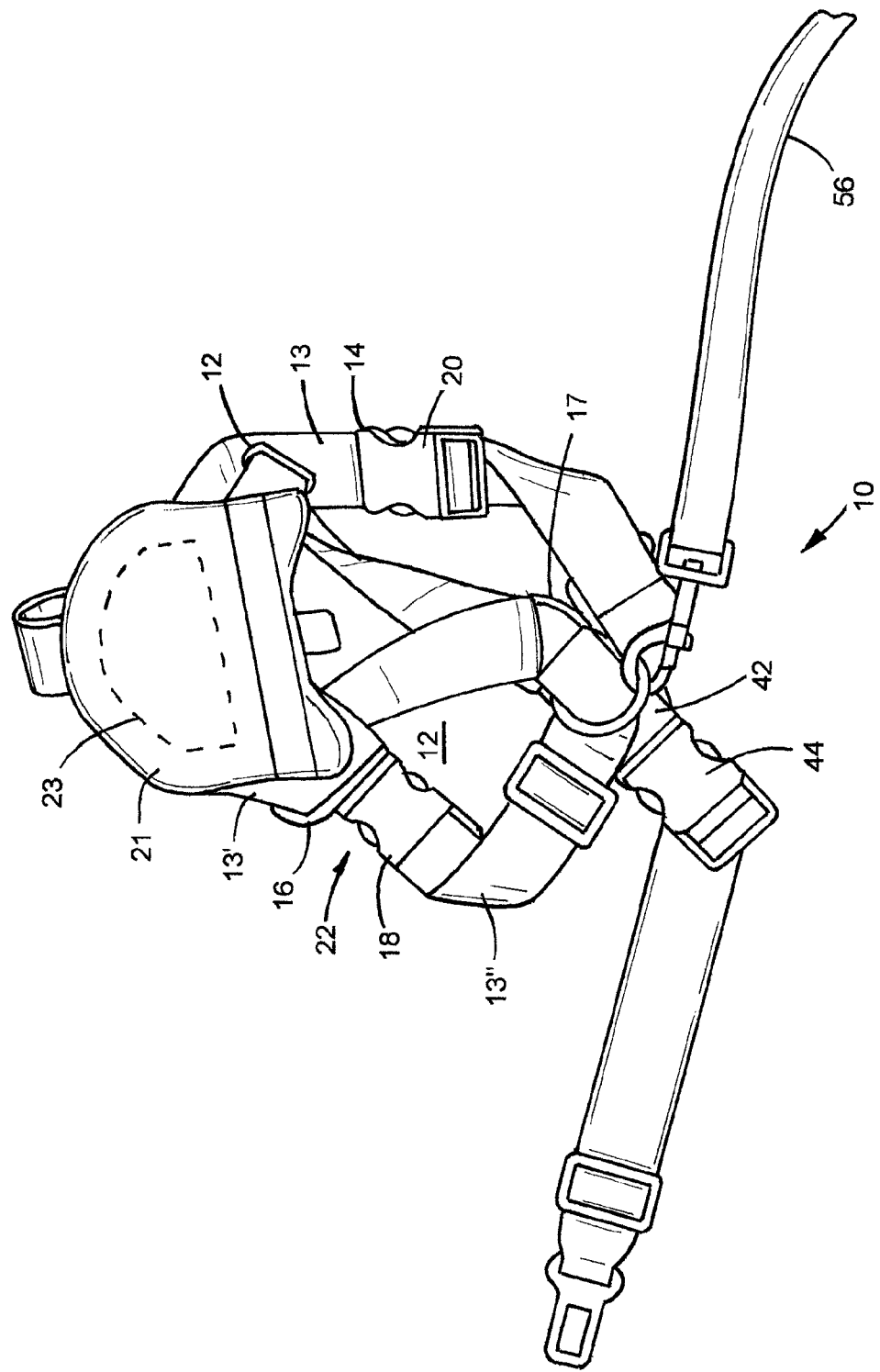
FIG. 2 is an alternate view of the harness in accordance with the present invention.
Figure 3:
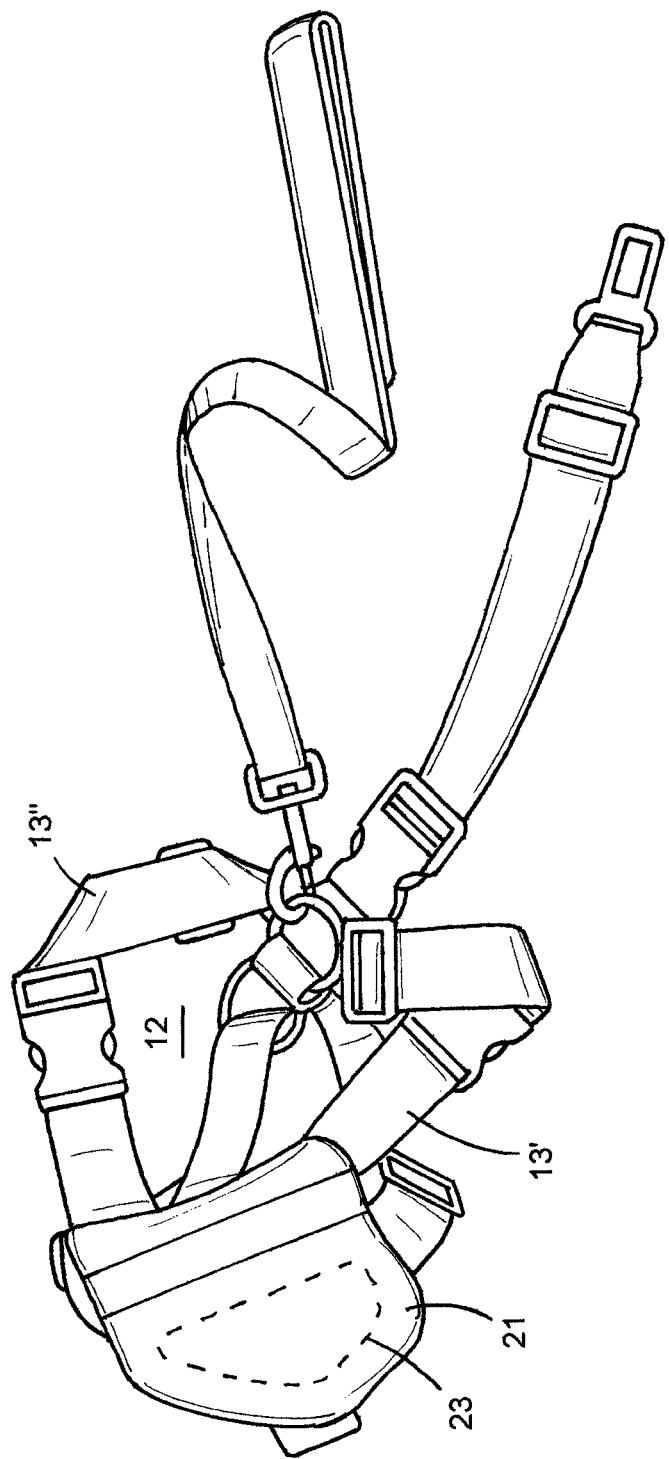
FIG. 3 is a further alternate view of the present invention.

In accordance with the present invention there is provided an animal harness which, generally, comprises: (a) a torso belting which encircles the upper torso of an animal, including the shoulder, neck and back; (b) a "quick release" or "buckle" for removably attaching a seatbelt latch connected thereto; (c) a pouch, which contacts with chest of the animal and is fixed to the torso belting, and (d) a pulsating device removably disposed within the pouch.

The pulsating device simulates a heartbeat and is situated in such a manner that the pulsations are transmitted about the heart of the animal.

The harness further includes means for detachably mounting a leash thereto.

The webbing or belting, which forms the harness, is formed from any suitable material, such as nylon or the like. The quick release buckles are also formed from any suitable materials such as HDPE, nylon and the like, as are the quick connect snaps.

Now, and with reference to the drawing, there is depicted therein a harness or torso belting in accordance with the present invention and which is, generally, indicated at 10. The harness includes a loop 12 formed from any suitable webbing 13 which encircles the neck and torso of the animal.

The webbing 13 comprises a first portion 13' and has a pair of opposed ends 14, 16, respectively, each of which carries a receptacle portion 18, 20, of a "quick connect" buckle 22.

As is known to those skilled to the art to which the present invention pertains quick connect buckles are well known and commercially available. They, generally, comprise a receptor or receptacle portion 18 or 20 and a locking or connecting portion 24 or 26.

The receptacle portion 18, 20 is a housing 28 having a pair of opposed side openings 30, 32. The locking portion 24, 26 comprises a compressible element which, when inserted into the receptor, compresses until it passes into the openings. Thereafter it expands outwardly.

The quick connect is achieved by compressing or forcing the locking portion inwardly into the housing 28 which causes the compression. Withdrawal of the locking portion from the receptor is achieved by reversing the process.

The webbing 13 also comprises a second portion 13" which is detachably secured via the quick connect buckles to the first portion 13'.

The two portions cooperate to form the loop or opening 12 through which the head of the animal extends.

By interconnecting the portions 13', 13" rearwardly of the legs of the animal (not shown), the harness encircles the neck and shoulder of the animal.

A medial webbing 15 has its free ends secured to the first webbing portion 13' as shown. In use, the medial webbing rests on the back of the animal.

A ring 17 is secured to the webbing 15 and defines a connector for various attachments, as described below.

In any event, the webbing 13 forms the loop or opening which envelops the upper torso, i.e., the neck and the shoulder of the animal.

A pouch 21 is fixedly secured to the first webbing portion 13' such as by sewing, gluing or the like. The pouch 21 has an interior pocket 36 in which is disposed a pulsating device 23.

The pulsating device 23, of the type contemplated for use herein, is well known and commercially available such as is sold under the name SnugglePuppie Heart Beat.

As noted, the ring 17 is affixed to the medial webbing 15 to which is connected web extension 15. Preferably, a second ring 40 is also affixed to the medial webbing 15.

A web extension 42 is secured to the ring 17 such as by sewing or the like and includes a quick connect buckle 44.

A seat belt latch 46 is removably connected to the extension 42 and includes an adjustable belting 48 and a latching mechanism 50 which is removably securable to a vehicular seat belt latch (not shown).

The present harness also includes a detachable leash 52. The leash comprises a belting 54 having a loop 56 which defines a means for hand holding the leash. The loop is formed at a first end of the leash. A carabiner 58 or similar device is disposed at the end opposite the loop 56 is used to latch the leash to the harness via the carabiner and ring 40, in the well-known manner.

By virtue of the quick release buckles and carabiners, it is possible to provide multiple configurations for the present harness and to convert the harness to: (a) a torso belting and leash, (b) a torso belting and a seat belt attachment; and (c) torso belting leash and seat belt assembly.

In any event, the pouch remains in contact with the animal while the harness is secured about the animal so that the pulsations can be transmitted therethrough and be used to calm the animal.

Also, it is possible to detach both the seat belt and the leash assembly and have only the harness disposed about the animal.

It should be noted that the present invention is particularly efficacious when used with a domestic animal and, in particular, a canine. However, it is equally applicable to felines and in some situations captured animals or exotic pets.

Having, thus, described the invention, what is claimed is:

1. An animal harness comprising: (a) a looped webbing which encircles the neck, shoulders, and back of an animal; (b) a pouch secured to the webbing, the pouch being in contact with the chest of the animal and in proximity to the heart of the animal; and (c) a pulsating device simulating a heartbeat disposed within the pouch.

2. The harness of claim 1 which further comprises: a leash detachably connectable to the looped webbing.

3. The harness of claim 1 which further comprises: a seat belt latch detachably connected to the looped webbing.

4. The harness of claim 1 which further comprises: a leash detachably connected to the harness and a seat belt latch detachably connected to the harness.

5. The harness of claim 1 which further comprises: at least one quick release receptor secured to the looped webbing.

6. The harness of claim 5 which further comprises: a seat belt latch detachably connected to the looped webbing and which comprises an elongated webbing having a quick release receptor disposed at a first end thereof and a quick release latch disposed at the end opposite, the quick release latch being detachably connectable to at least one quick release receptor of the harness.

7. The harness of claim 1 which further comprises: a pair of quick release buckle receptors secured to the harness.

8. The harness of claim 1 which further comprises: (a) at least one quick release receptor; and (b) a leash, the leash comprising an elongated webbing having a loop disposed at one end and a quick release latch detachably connected to the at least one quick release receptor.

9. The harness of claim 1 which further comprises: a ring secured thereto, the ring being adapted for removably receiving a carabiner attaching element.

10. An animal harness comprising: (a) a looped webbing which encircles the neck and shoulders of an animal; (b) a pouch secured to the webbing, the pouch being in contact with the animal; (c) a pulsating device disposed within the pouch; and (d) a seat belt latch detachably connected to the harness.

11. The harness of claim 10 which further comprises: a leash detachably connectable to the looped webbing.

12. The seat belt latch of claim 10 wherein the seat belt latch is detachably connected to the looped webbing.

13. The harness of claim 10 which further comprises: a leash detachably connected to the harness.

14. The harness of claim 10 which further comprises: at least one quick release receptor secured to the looped webbing.

15. The harness of claim 14 wherein the seat belt latch is detachably connected to the looped webbing and which comprises an elongated webbing having a quick release receptor disposed at a first end thereof and a quick release latch disposed at the end opposite, the quick release latch being detachably connectable to at least one quick release receptor of the harness.

16. The harness of claim 10 which further comprises: a pair of quick release buckle receptors secured to the harness.

17. The harness of claim 10 which further comprises: a leash, the leash comprising an elongated webbing having a loop disposed at one end and a quick release latch detachably connected to at least one quick release receptor.

18. The harness of claim 10 which further comprises: a ring secured thereto, the ring being adapted for removably receiving a carabiner attaching element.

* * * * *